United States Patent [19]

Catros et al.

[11] Patent Number: 4,771,467
[45] Date of Patent: Sep. 13, 1988

[54] METHOD OF IDENTIFICATION OF ARBORESCENT STRUCTURES IN DIGITAL IMAGES AND ITS APPLICATION TO AN IMAGE-PROCESSING DEVICE

[75] Inventors: Jean Y. Catros, Rennes; Denis Mischler, Acigne, both of France

[73] Assignee: Thomson-CGR, Paris, France

[21] Appl. No.: 937,618

[22] Filed: Dec. 3, 1986

[30] Foreign Application Priority Data

Dec. 4, 1985 [FR] France ................ 8517946

[51] Int. Cl.$^4$ .......................... G06K 9/00; G06K 9/68
[52] U.S. Cl. ........................................ 382/6; 382/21; 382/37
[58] Field of Search ................ 382/6, 16, 19, 21, 25, 382/30, 37; 358/111, 260

[56] References Cited

U.S. PATENT DOCUMENTS 4,499,596  2/1985  Casey et al. ..................... 382/37

OTHER PUBLICATIONS

Information Processing Letter, vol. 6, No. 6; Dec. 1977; pp. 184–186.
IEEE Transactions on Pattern Analysis and Machine Intelligence, vol. PAMI-7, No. 3, May 1985; pp. 299–305.

Primary Examiner—James J. Groody
Assistant Examiner—Michael D. Parker
Attorney, Agent, or Firm—Cushman, Darby & Cushman

[57] ABSTRACT

In a method for identification of arborescent structures detected in digital images by starting from model arborescent structures, a matching operation consists in comparing an object tree with a model tree. The method involves computation of the distance between the object tree and the model tree in accordance with a so-called Selkow iterative method which utilizes predefined cost values for elementary operations of label-changing, insertion or destruction of sub-trees in the descriptive lists of the trees to be identified. Starting from all the steps of computation of the distance measurement, the elementary operations which have served to arrive at the final distance are recorded and identification is obtained by label changes of the sub-trees reduced to branches.

3 Claims, 5 Drawing Sheets

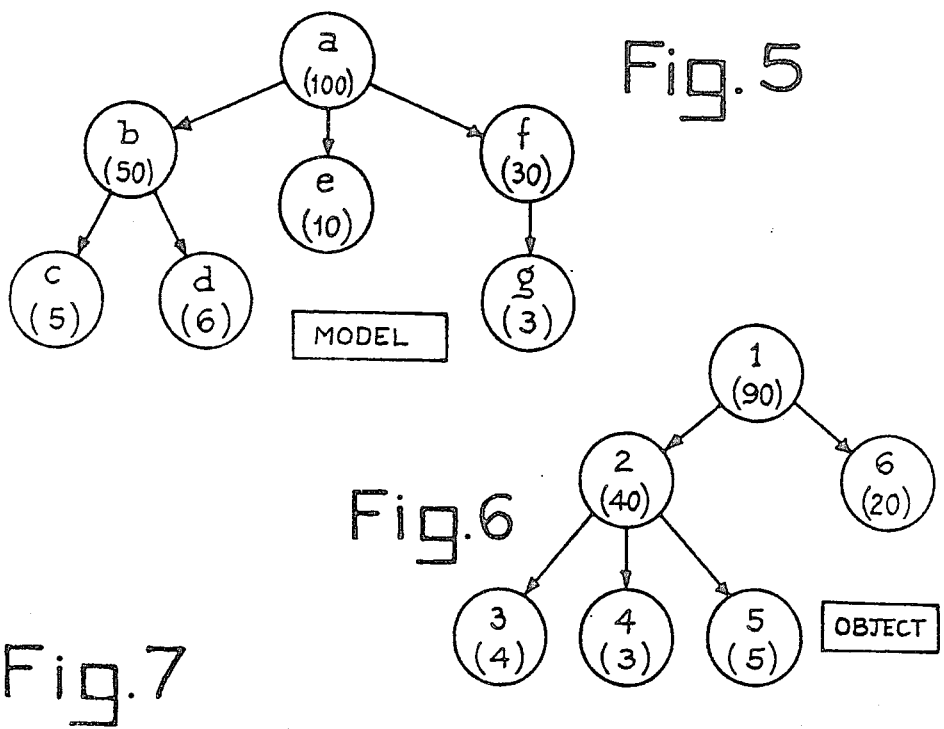

TAB₁

| T₁ / T'₁ | (b) ㊿ | (c) ⑤ | (d) ⑥ |
|---|---|---|---|
| (2) ㊵ | \|50−40\| ⑩ | 10 + 5 ←⑮ | 15 + 6 ←㉑ |
| (3) ④ | 10 + 4 ↑ ⑭ | Min ↖ ⑪ { 10+\|4−5\|, 14+5, 15+4 } | Min ↖ ⑰ ← { 15+\|6−4\|, 11+6, 21+4 } |
| (4) ③ | 14 + 3 ↑ ⑰ | Min ↑ ⑭ { 14+\|5−3\|, 17+5, 11+3 } | Min ↖ ⑮ { 11+\|6−3\|, 14+6, 17+3 } |
| (5) ⑤ | 17 + 5 ↑ ㉒ | Min ↖ ⑰ { 17+\|5−5\|, 22+5, 14+5 } | Min ↖ ⑮ { 14+\|6−5\|, 17+6, 14+5 } |

Fig. 8

TAB₅

| T₃ / T'₂ | f ㉚ | g ③ |
|---|---|---|
| (6) ⑳ | \|30 − 20\| ⑩ | 10 + 3 ←⑬ |

| TAB₂ T₂ / T₁′ | (e) ⑩ |
|---|---|
| (2) ㊵ | \|40\|−\|10\| ㉚ |
| (3) ④ | 30 + 4 ↑ ㉞ |
| (4) ③ | 34 + 3 ↑ ㊲ |
| (5) ⑤ | 37 + 5 ↑ ㊷ |

Fig.11

| TAB₄ T₃ / T₁′ | (f) ㉚ | (g) ③ |
|---|---|---|
| (2) ㊵ | \|30+40\| ⑩ | 10 + 3 ←⑬ |
| (3) ④ | 10 + 4 ↑ ⑭ | Min { 10+\|4−3\|, 13+4, 14+3 } ↖⑪ |
| (4) ③ | 14 + 3 ↑ ⑰ | Min { 14+\|3−3\|, 11+3, 17+3 } ↑⑭ |
| (5) ⑤ | 17 + 5 ↑ ㉒ | Min { 17+\|15−3\|, 14+5, 22+3 } ↑⑲ |

Fig.10

| TAB₃ T₁ / T₂′ | (b) ㊿ | (c) ⑤ | (d) ⑥ |
|---|---|---|---|
| (6) ⑳ | \|20 − 50\| ←㉚ | 30 + 5 ←㉟ | 35 + 6 ←㊶ |

METHOD OF IDENTIFICATION OF ARBORESCENT STRUCTURES IN DIGITAL IMAGES AND ITS APPLICATION TO AN IMAGE-PROCESSING DEVICE

BACKGROUND OF THE INVENTION

1. Field of the Invention

This invention relates to the field of recognition of shapes in images and more particularly to the identification of arborescent structures. The invention finds an application in the processing of digital images, especially in the medical field, for example for identification of blood vessels in images obtained by digital angiography.

There are many problems of shape recognition which can be considered tantamount to a study of arborescent structures, recognition being obtained when it is possible to cause a so-called "model" structure to correspond to an "object" structure detected in the image to be processed.

The invention has for its object a method of identification of arborescent structures in digital images. To this end, the data detected in the image on the one hand and the model data on the other hand must be represented conventionally in the same manner by a set of data which characterizes an arborescent structure.

2. Description of the Prior Art

There exists a method known as the "Selkow method" described for example in the article entitled "Selkow: Tree-to-tree editing problem" drawn from "Information Processing Letters", volume 6, N° 6, December 1977, which makes it possible to compare two arborescent structures by evaluating a "distance" between the two structures.

SUMMARY OF THE INVENTION

The method in accordance with the invention utilizes this method for finding a minimum distance between two trees, then determines the path which leads to this minimum distance in order to achieve the final result of identification between the object arborescent structure and the model with which it is sought to identify said structure.

In accordance with the invention, a method of identification of arborescent structures detected in digital images in which the branches of an object tree can be identified with those of a model tree, these two trees being defined in the form of a root and of a list of disjoint sub-trees each formed in the same manner or reduced if necessary to their root, a label vector being assigned to each branch and the components of said vector being a function of the characteristics of said branches, essentially consists:

in a first step, in converting the object tree to a model tree in a sequence of elementary operations on the entire set of sub-trees, a cost which is a function of the components of the label vectors of the branches constituting the sub-trees being assigned to each operation, these operations being either changes of label or insertions of sub-trees of the model tree or destructions of sub-trees of the object tree, and in selecting the least costly sequence of operations, the overall cost of which measures the distance between the trees in accordance with the so-called "Selkow" iterative method known per se, then in a second step in resuming the sequence of operations in the opposite direction starting from the last operation performed so as to produce in respect of each step of the iterative computation, in accordance with the elementary operation which has served to obtain the minimum cost:

either a change of label: a sub-tree of the object tree being identified with a sub-tree of the reference tree;

or insertion of a sub-tree of the model tree, in which case there is no corresponding sub-tree in the object tree;

or destruction of a sub-tree of the object tree, in which case there is no corresponding sub-tree in the reference tree; the result of identification being formed by the entire set of label changes in sub-trees reduced to their roots as obtained in this second step and the associated cost corresponding to the minimum distance of the sub-trees which have said branches as roots.

The invention is also concerned with the use of said method in a digital image processing device for such applications as recognition of blood vessels in images obtained by digital angiography.

BRIEF DESCRIPTION OF THE DRAWINGS

FIGS. 5 to 12 are tables illustrating the computation of the distance between two trees.

DESCRIPTION OF THE PREFERRED EMBODIMENT

In the method in accordance with the invention for identification of arborescent structures in a digital image, the characteristic data of these structures in the image and in the model are represented conventionally in the same manner and in accordance with the following scheme:

A tree structure is defined by a root which is, for example, the portion between two quasi-parallel lines which has the greatest width, and by branches also formed by quasi-parallel pairs of lines joined to the root itself or to other branches by means of arcs, each branch being the sub-tree root.

Each branch of a tree is characterized by a so-called label vector, the components of which are characteristic parameters. By way of example, in images obtained by digital angiography, each branch represents one blood vessel for which the label vector may include components such as the width, the length and the shape of the vessel considered with which the term vessel is also associated.

The data extracted from the digital image are structured in the same manner by detection followed by parameterization of contours in the image, detection of branches by recognition of quasi-parallel lines in the image followed by formation of the relational diagram between the branches, each branch being represented by a label vector, the components of which have the same structure as those of the model tree.

Figure 1:
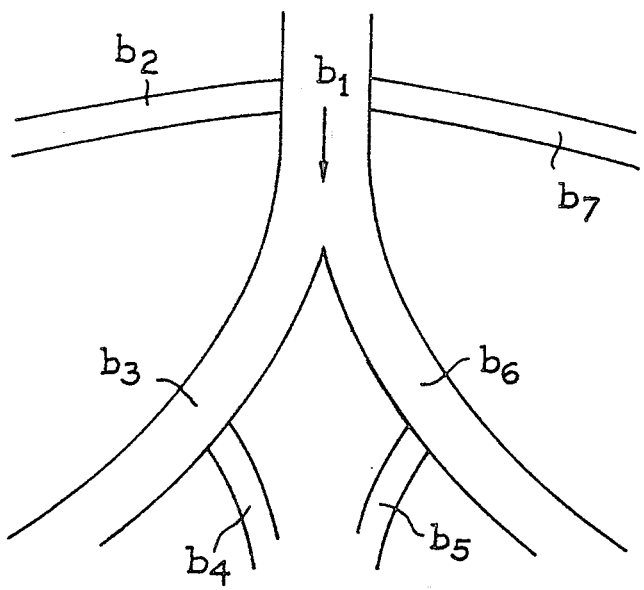
FIG. 1 illustrates one example of a model tree.

FIG. 1 represents one example of a model tree T: each branch $b_i$ has a label vector denoted by $E_i$, $i = 1$ to 7; $b_1$ is the root; $b_2$, $b_3$, $b_6$ and $b_7$ are branches connected to the root $b_1$; $b_4$ is connected to $b_3$ and $b_5$ is connected to $b_6$. The label of the root of T ($b_1$ in the example given above) is denoted by E(T).

Figure 2:
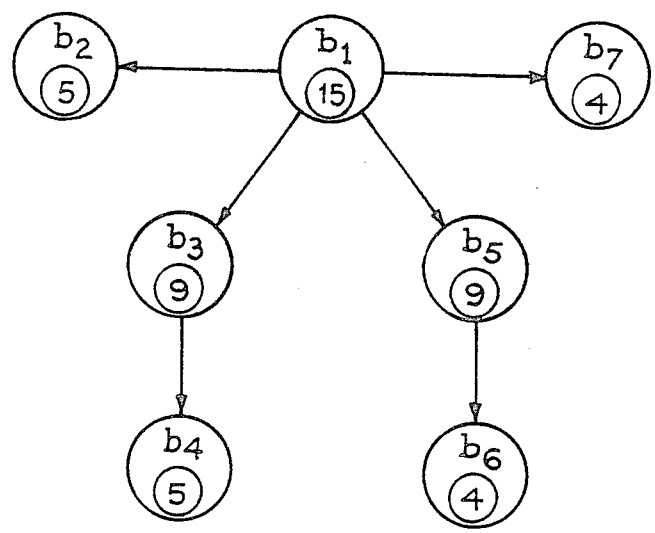
FIG. 2 is a relational diagram between the branches of the tree shown in FIG. 1.

FIG. 2 represents the relations between these branches as they appear in FIG. 1. Each branch is a node in this relational graph.

Figure 3:
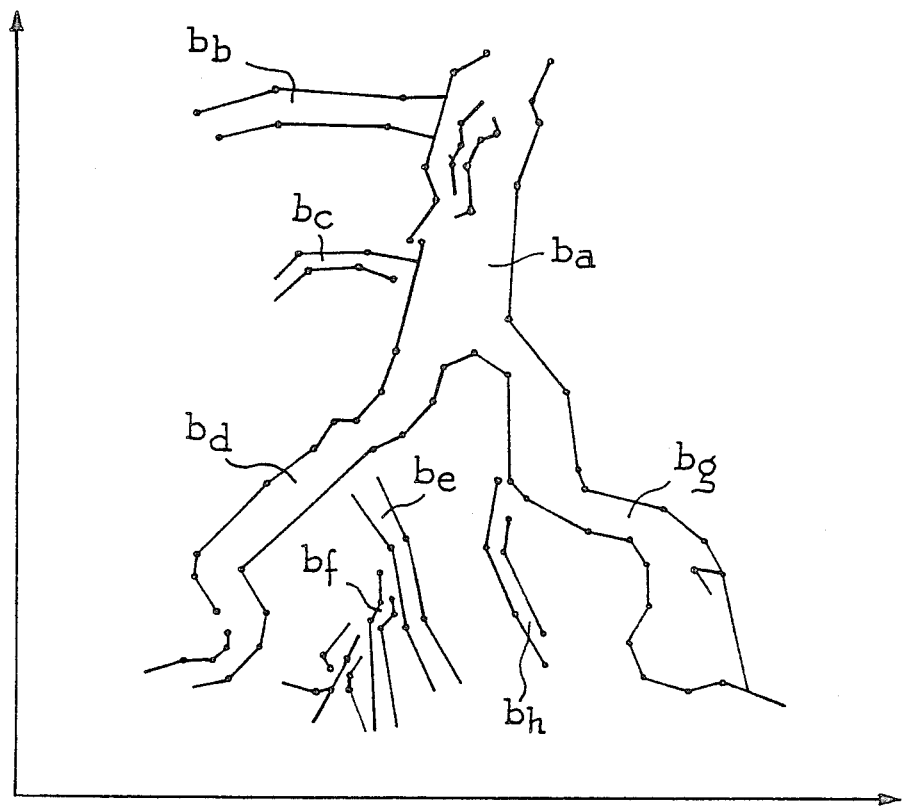
FIG. 3 illustrates one example of an object tree detected in a digital image.

FIG. 3 represents an example of an object tree T' detected in a digital image, in which each branch $b_j$ has a label vector $E_j$, j=a, b, ..., h. In accordance with the above notation E(T')=$E_a$.

Figure 4:
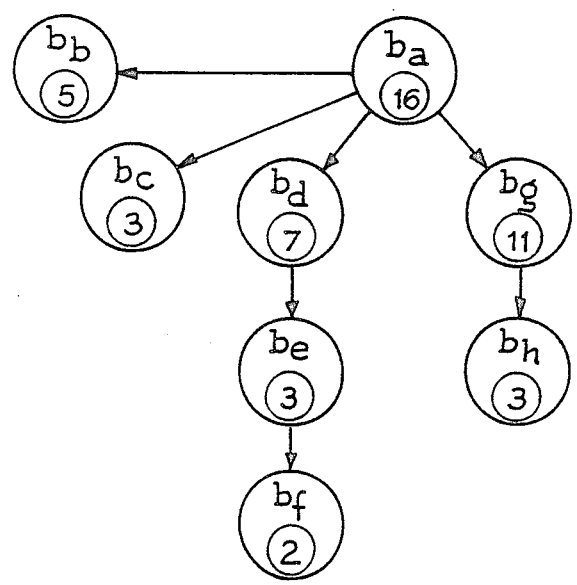
FIG. 4 is a relational diagram between the branches of the object tree shown in FIG. 3.

FIG. 4 represents a relational diagram between these branches as they appear in FIG. 3: $b_b$, $b_c$, $b_d$ and $b_g$ are connected to the root $b_a$, $b_f$ is connected to $b_e$ which is in turn connected to $b_d$, and $b_h$ is connected to $b_g$. Each branch is a node in this relational graph.

For the description of the model tree T and of the object tree T' aforesaid, each tree is defined as being made up of a series of disjoint sub-trees, an order being introduced between said sub-trees: for example, the sub-trees are described in the trigonometric direction, starting from the root to which a direction is given.

The model T can accordingly be represented by an ordered list L(T) of sub-trees: L(T)=($b_1$($b_2$) ($b_3$) ($b_4$))($b_5$($b_6$))($b_7$)); this list defines the connections between the root $T_0$=$b_1$ and the sub-trees $T_1$=$b_2$, $T_2$=$b_3$($b_4$), $T_3$=$b_5$($b_6$), and $T_4$=$b_7$. $T_i$ is the sub-tree of T of order i. Similarly, the data tree is represented by the following list L(T'): L(T')=($b_a$($b_b$) ($b_d$($b_e$($b_c$)) ($b_f$))) ($b_g$($b_h$))), which defines the connections between the root $T_0'$=$b_a$ and the following sub-trees $T_1'$=$b_b$, $T_2'$=$b_c$, $T_3'$=$b_d$($b_e$($b_f$)) and $T_4'$=$b_g$($b_h$). A sub-tree such as $T_2$ for example in turn has a root $b_3$ and a sub-tree $b_4$. Subtrees such as $b_4$ or $T_1$=$b_2$ are reduced to their roots.

As mentioned earlier, in order to compute a "distance" between trees which will then make it possible to determine the "minimum" distance for finally achieving identification of the object tree with the model tree, it is necessary to define this "distance". A tree being defined by the sub-trees which make up the tree in an ordered series as indicated in the lists given above, the set of sub-trees can be endowed with a certain number of operations which will subsequently make it possible to define the distance between two trees.

The equality between two trees is first defined: two trees are said to be equal if their roots have the same label and if the ordered lists of their sub-trees are identical.

Three elementary operations are then defined in the entire set of trees by operations on the labels:

1. Change of label of a tree:

A tree T can be converted to a tree T* by a change in label as follows: the label of its root E(T) is replaced by the label of the root of T*, E(T*); the list of sub-trees of T* is the same as the list of sub-trees of T.

2. The insertion of a sub-tree in the descriptive list of a tree: a sub-tree can be inserted in an ordered descriptive list of sub-trees of a tree T at a given row in order to form a modified tree T*. The label of its root does not change: E(T*)=E(T) and the initial list: L(T)=$T_0$, $T_1$ ... $T_i$, $T_{i+1}$ ... $T_m$ of the sub-trees of T becomes the list L(T*) after insertion of a sub-tree A: L(T*)=$T_0$, $T_1$, ... $T_i$, A, $T_{i+1}$ ... $T_m$.

3. Destruction of a sub-tree $T_i$ in the ordered list of sub-trees constituting a tree T in order to form a tree T*: the label of the root does not change: E(T*): E(T) and the initial list L(T)=$T_0$ $T_1$ ... $T_{i-1}$, $T_i$, $T_{i+1}$, ... $T_m$ becomes after destruction of $T_i$: L(T*)=$T_0$, $T_1$ ... $T_{i-1}$, $T_{i+1}$ ... $T_m$.

With each of these elementary operations is associated a cost which depends on the values assigned to the root or to the different branches of the inserted or destroyed sub-trees. The value assigned to a branch can be a combination of components of the label vector of this branch. The most simple example consists in taking one of the components of the label vector such as, for example, the width of the branches.

For the label-changing operation, it is necessary to provide a matrix of costs for converting a label $E_i$ to a label $E_j$, namely $C_T(E_i, E_j)$ for all the i's and j's. For example, this cost can be the difference between the widths in the case of sub-trees reduced to branches.

For the other operations (destruction and insertion of sub-trees in a tree), it is necessary to employ elementary costs of destruction and insertion of a tree reduced to a branch labelled $E_i$. These elementary costs of destruction and of insertion will be designated respectively as $C_D(E_i)$ and $C_I(E_i)$. The insertion cost $C_I(A)$ of a sub-tree A in an ordered list of sub-trees is equal to the sum of insertion costs of the constituent sub-trees of A. In the case of a sub-tree reduced to one branch, this insertion cost is only the elementary cost indicated earlier, namely the width of one branch, for example.

Similarly, the cost of destruction of one sub-tree A is equal to the sum of costs of destruction of the constituent sub-trees of the sub-tree A. In the case of a sub-tree reduced to one branch, this cost (as is the case with the insertion cost) can be a value assigned to said branch, namely the width, for example.

Measurement of the distance between two trees A and B is then obtained by means of a recursive procedure as described by the Selkow algorithm indicated above which assigns a global cost to the transformation series which are possible for transforming the tree A into the other tree B. These transformation series take place in a sequence of elementary operations to which an elementary cost is assigned in each case. The minimum distance d(A,B) between the two trees labelled A and B will be the global cost of the least costly method of transforming the departure tree to the arrival tree. This cost takes into account both the modifications of structures, insertions and suppressions of sub-trees and modifications of labels.

Considering two trees, namely tree A made up of sub-trees $A_1$, ... $A_m$ and tree B made up of sub-trees $B_1$ ... $B_n$; $A_0$ and $B_0$ are the roots and T(i) is the tree obtained by removing from a tree T the sub-trees from the order i+1 to the last on the list. Then if $T_m$ is the last sub-tree of the descriptive list of T, we have in particular T(m)=T and T(0)=$T_0'$ root of T. Selkow has shown that the distance d(A,B) between a first tree A and a second tree B is such that:

$$-d(A(0),B(j)) = C_T(E(A),(E(B)) + \sum_{k=1}^{j} C_I(Bk)$$

$$-d(A(i),B(0)) = C_T(E(A),E(B)) + \sum_{k=1}^{i} C_D(Ak)$$

$$-d(A(i),B(j)) = \text{Min} \begin{cases} \cdot d(A(i-1),B(j-1)) + d(Ai,Bj) \\ \cdot d(A(i),B(j-1)) + C_I(Bj) \\ \cdot d(A(i-1)),B(j) + C_D(Ai). \end{cases}$$

A detailed study in fact shows that the operations involved in label changing, insertion or destruction of a sub-tree never change the order of the sub-trees. A computation of the dynamic programming type is consequently adopted for the measurement of distances.

Accordingly, the computation can immediately be deduced therefrom as follows:

1. For $j = 0$ to $n$, we put $$d(A(0), B(j)) = C_T(E(A), EB)) + \sum_{k=1}^{j} C_I(Bk)$$

2. For $i = 0$ to $m$, we put $$d(A(i), B(0)) = C_T(E(A), EB)) + \sum_{k=1}^{i} C_D(Ak)$$

3. For $i = 1$ to $n$, we put
For $j = 1$ to $m$, we put $$d(A(i), B(j)) = \text{Min} \begin{cases} (d(A(i-1), B(j-1)) + d(Ai, Bj); \\ d(A(i), B(j-1)) + C_I(Bj); \\ d(A(i-1), B(j)) + C_D(Ai) \end{cases}$$

This computation is recursive since it is necessary to compute $d(Ai, Bj)$ in order to compute $d(A(i), B(j))$, $Ai$ and $Bj$ being trees themselves.

FIGS. 5 and 6 represent another example respectively of a model tree and of an object tree to be identified therewith.

The following example of computation applied to the trees shown in the diagrams of FIGS. 5 and 6 illustrates the distance computation in accordance with the method known per se and described earlier.

The value of a branch is denoted between brackets in the nodes shown in FIGS. 5 and 6 under the label of the branch which is denoted solely by its index a to g in the model tree and 1 to 6 in the data tree.

The following costs are defined:
Cost of change of label $C_T(Ei, Ej) = |Ci - Cj|$
Cost of insertion = cost of destruction = Ck.

The solution is given in a series of tables in FIGS. 7 to 12. The table $TAB_0$ serves to compute the distances between the sub-trees of the first lists. The model tree is represented by the list $L(T) = (a(b(c) (d)) (e) (f(g)))$ with the following sub-trees:

a: root $T_0$;
b(c)(d): sub-tree $T_1$, (c) and (d): sub-trees of $T_1$;
(e): sub-tree $T_2$; no sub-tree;
f(g): sub-trees $T_3$; (g): sub-tree of $T_3$.

Similarly, the data tree is represented by the list $L(T') = (1 (2(3) (4)(5))(6))$.
1: root $T'_0$;
2(3)(4)(5): sub-tree $T'_1$, where (3), (4) and (5) are sub-trees;
(6): sub-tree $T'_2$; no sub-tree.

FIG. 7 represents the first table which illustrates the solution: $TAB_0$. The inputs of this table are in horizontal rows, the list of sub-trees of T is given horizontally and the list of sub-trees of T' is provided in a vertical column. In the case of each sub-tree, there has been computed a value equal to the sum of values of the branches and indicated under the corresponding sub-tree; these values are circled.

In the first horizontal row or line, there appear the distances computed between the root $T'_0$ and the trees $T(0)$, $T(1)$, $T(2)$, $T(3) = T$, these distances being computed in the first computational step: $d(T'(0); T(j))$.

Similarly, there appear in the first column the computed distances between the root $T_0$ and the trees $T'(0)$, $T'(1)$, $T'(2) = T'$, these distances being computed in the second computational step $d(T'i)$, $T(0)$. The other computations are performed in the third step by employing in some cases the necessary intermediate computations which are apparent from the following tables. The table $TAB_1$ given in FIG. 8 serves to compute the minimum distance between $T_1$ and $T'_1$, namely 15; the table $TAB_2$ given in FIG. 9 serves to compute the distance between $T_2$ and $T'_1$, namely 42; the table $TAB_3$ given in FIG. 10 illustrates the computation of the distance between $T_1$ and $T'_2$, namely 41; the table $TAB_4$ given in FIG. 11 illustrates the computation of the minimum distance between $T'_3$ and $T'_1$, namely 19; and the table $TAB_5$ of between $T_3$ and $T'_1$, namely 19; and the table $TAB_5$ of FIG. 12 illustrates the computation of the distance between $T_3$ and $T'_2$, namely 13; the distance between $T_2$ and $T'_2$ is obtained immediately by reason of the fact that the two sub-trees are reduced to their roots by the difference in values $(20+10)$, namely 10. These values which are underlined in table $TAB_0$ are then employed for final computation of the minimum distance between the trees T' and T as illustrated in table $TAB_0$ of FIG. 7. The minimum distance thus obtained is 48 in the example illustrated in FIGS. 5 to 12.

The problem which then remains to be solved consists in identifying the object and model nodes on the basis of these results or in other words in returning on the path which has led to obtainment of the minimum distance between the object tree and the model tree. To this end, each cost obtained in one computational step as shown in the corresponding square carries an arrow which indicates the choices made at each stage when performing tests on the minimum costs, or the origin of the value adopted as an initial value for cost computation when there has not been any choice.

The method for finding a pathway to the minimum distance consists in following the path in the direction of the arrows which interconnect the costs. In the example considered in the foregoing, this gives the following associations obtained by reading the table $TAB_0$:

$T'_2 = T_3$; cost: 13 (complex cost)
insert $T_2$; cost: 10 (insertion cost)
$T'_1 = T_1$; cost: 15 (complex cost)
$T'_0 = T_0$; cost 10 (by a change of label).
Namely a total cost equal to 48.

Identification is not completed since the label changes $T'_1 = T_1$ and $T'_2 = T_3$ are complex operations which have to be split-up. The splittings result from reading of the table $TAB_1$ for the identification $T'_1 = T_1$ and from reading of the table 5 for the identification $T'_2 = T_3$.

From table $TAB_1$ of FIG. 8, the following are obtained:
(5) = (d) label change: cost 1
(4) destroyed: destruction cost: 3
(3) = (c) label change: cost 1
(2) = (b) label change: complex cost 15.

From table $TAB_5$ of FIG. 12, the following are obtained:
insert (g) (not found in the object tree): cost 3
(6) = (f) label change: complex cost 13.

Identification is then complete since it has been performed up to the level of the branches.

In more general terms, in order to obtain identification between an object tree and a model tree which are represented by lists having the root as first element and the sub-trees as following elements, if the indices $i=1$ to n correspond to the sub-trees of the model tree and if the indices $j=1$ to n correspond to the sub-trees of the object tree as indicated in the foregoing, the path which has led to obtainment of the minimum distance is followed-back from (m, n).

The following description relates to the application of this method to an image-processing device, especially for images obtained by digital angiography. Angiography is a radiological technique for visual display of blood vessels, the principle of which is as follows: a contrast-enhancing product is injected into a vessel and radiographs of the region of the body to be examined are taken at uniform intervals of time. The sequence of images obtained by subtraction from a reference image taken prior to injection of the contrast product produces the image of the vessels and provides indications in regard to the rate of propagation of the contrast product within said vessels.

This examination is employed for detecting pathologies and mainly stenoses (obstruction) or aneurysms (dilation) of blood vessels.

At the present time, the examination is performed entirely by hand. In order to automate an examination operation of this type, a first step consists in automatic identification of the blood vessels with respect to an anatomic model of the circulatory system in the examination region under consideration.

The different steps of the process employed are as follows:
1. Choice in the sequence of difference images of an image which exhibits high contrast.
2. Detection of contours, filtering, bridging and parameterization of these contours.
3. Detection of vessels.
4. Formation of inter-vessel relational tree.
5. Matching of the detected vascular tree and of the anatomic model which has been put in the same form.

The method described earlier is employed for carrying out this last matching step. The preliminary steps 1 to 3 which are necessary for formation of arborescent structures in the digital images are beyond the scope of the present invention. For the application of the method of identification in accordance with the invention, the following elements are considered for the formation of the model structure: the blood-vessel system has a natural three-dimensional tree structure. If the largest artery is taken as a root, it then subdivides into smaller vessels, and so on in sequence. The angiographic image corresponds to the projection of this structure on a plane. In the case of one and the same region, the images obtained can be very different according to the orientation of this visualization plane. Consideration will therefore be given to a different model for each type of angiography (region of interest and angle of visualization). These models are supplied by practitioners.

The model in the form of a tree for application of the method is constituted as follows:

The largest artery corresponds to the root of the tree and the vessels which extend therefrom are the branches. The branches are joined to the root by an arc and are in turn roots of the sub-trees formed by their tributary vessels.

An order is introduced in said sub-trees. By way of example, the sub-trees are followed in the trigonometric direction, starting from the root which is oriented in the direction of blood flow. As mentioned earlier, each branch of the tree is labelled by a set of parameters which are characteristic of the vessel which it represents. This label is in fact a vector constituted by a certain number of components such as width, length, shape and so on, together with the name of the vessel considered.

The data extracted from the angiographic image must naturally be structured in the same manner. This is step 4 designated earlier as "formation of intervessel relational tree". It is necessary to determine the connections between vessels and the direction of these connections and to remove the different uncertainties (crossing or junction, direction).

One then arrives at a description of the image to be labelled in the form of a tree in which each branch is also represented by a vector of components having the same structure as that which characterizes the branches of the model.

In order to employ the method of matching described earlier, it is necessary to define the different elementary costs: label-changing cost, insertion cost and destruction cost. These costs are computed from the label vector associated with each branch.

By way of example and as mentioned in the foregoing, the insertion or destruction costs are equal to the vessel width and the substitution cost is equal to the absolute value of the difference in widths of the two vessels considered.

For simulation purposes, a test image of the type shown in FIG. 3 has been chosen. This image exhibits a large number of vessels and therefore provides a fairly complete tree. Moreover, parasitic segments and holes in the contours have been introduced for closer approximation to a real case.

The model selected for the matching operation corresponds to the tree shown in FIG. 2. A possible representation is given in FIG. 1. In order to ensure that the test should be fairly critical, the selected model was rather different from the data: the branch $b_7$ of the model does not appear in the data; the branches $b_c$ and $b_f$ of the data do not appear in the model.

The result of the association obtained is: $b_a = b_1$; $b_b = b_2$, $b_3 = b_d$, $b_4 = b_e$, $b_5 = b_h$, $b_6 = b_g$. All the vessels of the image of the data existing on the model have in fact been identified. The other data have been detected as requiring to be either destroyed or inserted in the matching process.

Similarly, the application of the method to real data has made it possible to demonstrate the validity of the method.

The invention is not limited to the method as described in detail in the foregoing or to its application to angiographic digital images.

What is claimed is:

1. A method of identification of arborescent structures detected in digital images in which the branches of an object tree can be identified with those of a model tree, these two trees being defined in the form of a root and of a list of disjoint sub-trees each formed in the same manner or reduced if necessary to one branch, a label vector being assigned to each branch and the components of said vector being a function of the characteristics of said branches, wherein said method comprises:

in a first step, in converting the object tree to a model tree in a sequence of elementary operations on the entire set of sub-trees, a cost which is a function of the components of the label vectors of the branches constituting the sub-trees being assigned to each operation, these operations being either changes of label or insertions of sub-trees of the model tree or destructions of sub-trees of the object tree, and in selecting the least costly sequence of operations, the overall cost of which measures the distance between the trees in accordance with the so-called "Selkow" iterative method known per se, then in a second step in resuming the sequence of operations in the opposite direction starting from the last operation performed so as to produce in respect of each step of the iterative computation, in accordance with the elementary operation which has served to obtain the minimum cost:

- either a change of label: a sub-tree of the object tree being identified with a sub-tree of the reference tree;
- or insertion of a sub-tree of the model tree, in which case there is no corresponding sub-tree in the object tree;
- or destruction of a sub-tree of the object tree, in which case there is no corresponding sub-tree in the reference tree;

the result of identification being formed by the entire set of label changes of the sub-trees reduced to their roots as obtained in this second step and the associated cost corresponding to the minimum distance of the sub-trees which have said branches as roots.

2. Application of the method according to claim 1 to a device for processing digital images.

3. Application according to claim 2 to images obtained by digital angiography for identification of blood vessels.

* * * * *